United States Patent [19]
Packard

[11] Patent Number: 5,612,843
[45] Date of Patent: Mar. 18, 1997

[54] METHOD FOR ACCURATELY SETTING THE GAP IN AN INDUCTIVE MAGNETIC HEAD

[76] Inventor: Edward L. Packard, 908 Noreen Ct., San Marcos, Calif. 92069

[21] Appl. No.: 349,982

[22] Filed: Dec. 6, 1994

[51] Int. Cl.$^6$ .................................................. G11B 5/17
[52] U.S. Cl. .......................... 360/123; 360/126; 29/603.1
[58] Field of Search ..................................... 360/110, 119, 360/122, 123, 125, 126; 29/603.01, 603.27

[56] References Cited

U.S. PATENT DOCUMENTS

| | | | |
|---|---|---|---|
| 4,390,916 | 6/1983 | Chow | 360/127 |
| 4,675,986 | 6/1987 | Yen | 29/603 |
| 4,689,877 | 9/1987 | Church | 29/603.1 |
| 5,242,524 | 9/1993 | Leach | 156/345 |

OTHER PUBLICATIONS

Reprint of Proceedings of the Six International Conference on Ferrites(ICF6); Tokyo and Kyoto Japan; 1992, Pulse Transfer Analysis of Ferrites for Recording Head Applications; A. Sano, P. Chittipom, K. Honda, E. Packard, V. Nguyen, R. Limb, T. Watanabe; pp. 1468–1471.

*Primary Examiner*—A. J. Heinz
*Attorney, Agent, or Firm*—Robert S. Kelly

[57] ABSTRACT

A process for manufacturing magnetic heads whereby a pair of separate coils are placed about the opposed legs of the magnetic loop core element with one coil comprising the read/write coil and the other coil being placed adjacent the gap in the core. During the removal of material from the core element to set the throat height at the gap thereof, a variable current signal is provided to the read/write coil while the other coil generates voltage pulses due to flux changes in the magnetic core element with the magnitude of such voltage pulses being used to monitor the removal process so that the correct throat height is set according to predetermined magnetic characteristics of the core element.

13 Claims, 4 Drawing Sheets

METHOD FOR ACCURATELY SETTING THE GAP IN AN INDUCTIVE MAGNETIC HEAD

BACKGROUND OF THE INVENTION

1. Field of the Invention

The present invention pertains to electromagnetic heads for the reading/writing of information on a relatively moving magnetic recording medium, and more particularly, it pertains to the method of manufacturing such magnetic heads by controlling the throat height so as to achieve the desired magnetic characteristics through the manufacturing processes and in the finished product.

2. Description of the Prior Art

Magnetic recording heads, for reading from or writing on a moving medium, such as a disk or tape, have received a considerable amount of attention recently due to the ever increasing requirements for storing a larger amount of information within a given surface area of the medium and the consequent dimensional requirements imposed on the head to enable it to magnetically transfer information at the required rates. Such magnetic heads generally are comprised of a core element forming a continuous loop magnetic flux path having a gap therein in the submicron range, an electrically conductive coil wrapped about the core element to create flux movement in the core or to be energized by such flux movement in the core, and a mounting element (slider) mounting the core and the winding thereof in a position so that the gap faces and rides upon an air bearing surface over the moving medium during reading/writing of information.

The magnetic performance of a magnetic recording head, as determined by the magnetic flux behavior within the core element magnetic loop path, is directly related to the nature and dimensions of the materials selected to be used in the magnetic loop and particularly the dimensions of the gap therein. The throat height of the gap, i.e., the dimension of the gap perpendicular to the surface of the recording medium, primarily functions to optimize the write field as seen by the medium so as to cause the magnetic transitions written into the medium by the write field from the core to be accurately and consistently formed and placed. It has generally been assumed heretofore that in the manufacture of magnetic heads the various parameters involved, e.g., the magnetic properties of the recording medium and the dimensions and spacing of the various elements of the head, were constant and that thus there would be one best mechanical dimension for the throat height which would provide the optimum performance for the particular magnetic head being designed. It may be demonstrated, however, that the various magnetic and physical parameters involved for the various materials employed to fabricate the core at each of the many core manufacturing processing steps are affected by normal variations in material and the processing thereof. Thus, as a result of such many dimensional and magnetic variations which may exist during the manufacturing process, it can be shown that a unique value for the throat height dimension may be necessary for each particular magnetic head. This is particularly true in current manufacturing processes where very thin film heads are used with exceedingly fine spacing and dimensions of the head elements.

In the past, magnetic cores were larger, the tracks were wider, gaps were wider, flux changes per second per inch of medium were lower, gap to recording medium distances were greater, and medium thicknesses were greater; thus, the required throat heights were larger and the variations in the dimensional and magnetic parameters were less critical to the performance of the core in the magnetic head. Under these conditions, a nominal value of throat height could be chosen, and this was deemed sufficient for use in all cores fabricated for use in a particular recording system despite variations in the parameters due to manufacturing tolerances. As magnetic recording has evolved to the present level of packing densities and transfer rates, the control and measurement of the dimensional and magnetic material parameters for the required cores has become increasingly demanding. Throat heights are still established by the machining methods of grinding and/or lapping, but the machines employed have become increasingly sophisticated and the applied processes increasingly difficult to monitor and control. The requirements of dimensional measurement have passed the limits of resolution for the conventional microscopes that are considered both affordable and useable in the production environment.

The early method of controlling the throat height in a magnetic head was to grind and lap to machine and tooling tolerances and to measure with low power microscopes. This was acceptable when the values for the throat heights were larger than several milliinches. As throat height dimensions entered the micron range and even fractions of a micron, machining, tooling, and process variations forced the evolution of an iterative technique consisting of lap, measure, adjust, lap, measure, adjust, etc., until the specified throat height dimension was obtained. The measurement method was still an optical technique, but the optical measuring equipment was now of a special design. In general, no attempt was made to look at the magnetic performance of a particular magnetic head in order to adjust the throat height therefor.

With the advent of thin film heads, the throat height dimensional values were further reduced. Optical reference patterns were included as a part of the masks used in the production of the thin film elements. These optical guides, which are located on the wafers adjacent to the thin film elements, determine the throat height dimension as a function of the lapping process by the iterative method of lap/look/measure. However, because of the continued requirement for smaller throat height dimensional values, the resolution limits of affordable optical measuring equipment to accurately view the guides limited the effectiveness of these methods.

The preferred method today of controlling the throat lap height in the magnetic head manufacturing industry is through the use of a resistive element placed alongside the head which element can be electrically monitored as its length is changed during the grinding or lapping process as shown, for example, in U.S. Pat. No. 4,675,986 to Yen. The resistive elements are placed on the wafer adjacent to the magnetic elements as were the optical lapping guide patterns previously described. The electrical values of the resistive elements are a function of the materials used, the thickness of the resistive layer, and any variations in these parameters caused by the wafer making and machining processes. Because of this last factor, the resistive lapping guide method is best done by using a ratio approach or rate of change of resistive value as opposed to lapping to a specific value of resistance as the throat height indicator. Even so, the resistive guide can only provide a predetermined desired throat height and cannot take into account the processing and material variations in the head materials normally encountered.

Some work has been done toward using the inductance of the winding in the core element as the throat height lapping control method. However, there are several problems associated with this approach. Since most of the inductance in the core winding comes from a magnetic material directly within the winding and since the gap and throat height area are not within the winding, the inductive changes are not directly related to changes in the throat configuration. As the track widths become narrower, and hence the thickness of the core elements correspondingly decrease, the inductive change due to throat height dimensional value change becomes less definitive.

In a paper coauthored by the present inventor entitled "Pulse Transfer Analysis of Ferrites For Recording Head Applications", Proceedings of the Sixth International Conference on Ferrites, Tokyo, Japan, 1992, a method was proposed that allows monitoring of the appropriate magnetic properties of various ferrites used in magnetic head applications. This method involved the use of a pair of separate windings placed about a toroid of ferrite material. An electrical test pulse or series of pulses are applied to one of the windings and the response pulse or pulses induced in the other winding is detected and separately analyzed under varying processing factors such as lapping, polishing, annealing and film deposition, and varying combinations of the foregoing.

SUMMARY OF THE INVENTION

In accordance with the present invention, a method of manufacturing a magnetic head is provided which comprises providing upon a substrate a core element of magnetically conductive material having a pair of windings of electrically conductive material wound thereabout, applying a varying current to one of the windings, and monitoring the flux in the magnetic loop via the other of the windings in order to ascertain that the appropriate magnetic characteristics are present in the core element, and particularly at the gap thereof.

In a conventional magnetic core manufacturing process, portions of the core are removed directly adjacent to the gap in the core to gradually reduce the height of the gap, i.e. the throat height, until the appropriate magnetic characteristics for the magnetic head are obtained. Thus, with the process of the present invention, the electrical response in the secondary winding is continuously monitored during the removal process until the appropriate throat height is obtained. It will be recognized that, unlike the prior art methods, this throat height will not depend upon a predetermined measured height but may vary from such predetermined measured height if the manufacturing or processing conditions vary in an unknown and undefined way from some standard during the manufacturing and processing of the head.

The method of the present invention will find particular utility in the thin film magnetic head manufacturing processes wherein a series of heads aligned in a horizontal row on a wafer are simultaneously lapped to set the throat height. By monitoring the flux characteristics in at least the end heads in such a line of heads, the appropriate throat characteristics can be set for the entire line.

DESCRIPTION OF THE PREFERRED EMBODIMENT

Figure 8:
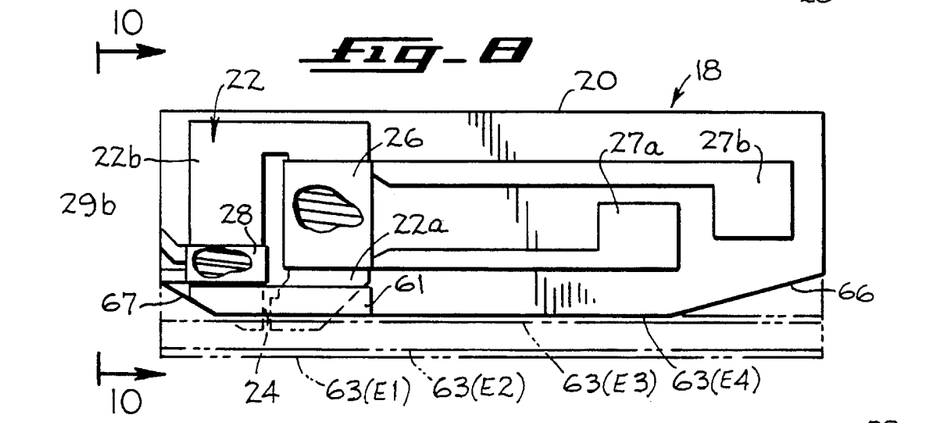
FIG. 8 is an enlarged front elevation of one of the magnetic heads of FIG. 4 in its final configuration after the lapping thereof.
Figure 9:
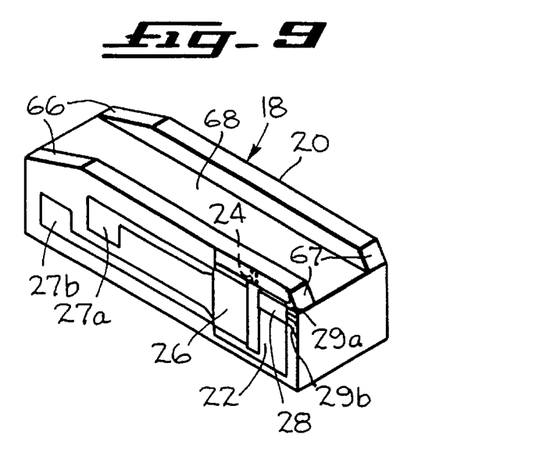
FIG. 9 is a reduced isometric view of the magnetic head of FIG. 8.
Figure 10:
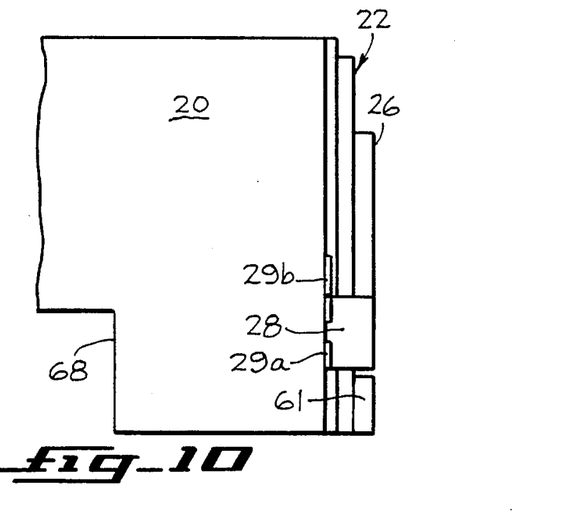
FIG. 10 is an enlarged partial end elevation taken in the direction of the line 10—10 of FIG. 8.

In the preferred embodiment of the present invention, illustrated in FIGS. 1–11 of the drawings, the process of the present invention is embodied in the fabrication of magnetic recording heads using conventional thin film deposition techniques. In particular, the method of the present invention will be described in connection with a recent innovation in magnetic head processing technology wherein the magnetic head material is deposited on the side of the slider element rather than on the rear or underface thereof. This is illustrated in the finished magnetic head 18 as shown in FIG. 9 of the drawings wherein the slider element 20 is provided with a magnetic core element 22 having a gap 24 therein with such core element being deposited on the side of the slider element. By utilizing such a deposition process, the thickness of the core deposition at the gap 24 therein determines the track width in the recording system.

Figures 1, 2A:
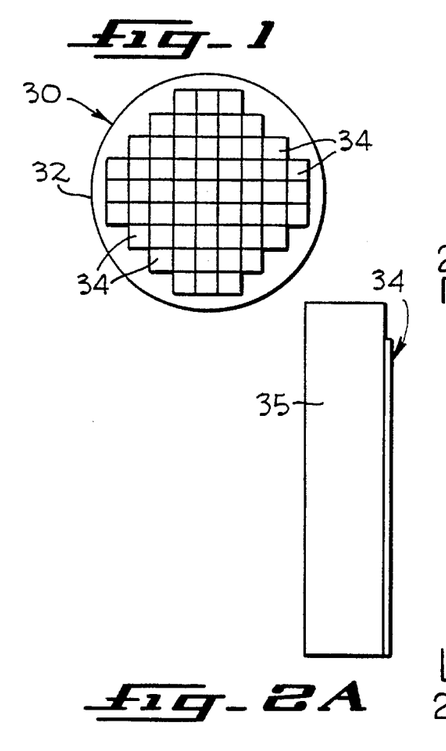
FIG. 1 is a diagrammatic view of a wafer used in the manufacture of the thin film magnetic heads of the present invention which wafer has been subdivided into a number of segments each containing a plurality of parallel rows of aligned magnetic heads.
FIG. 2A is a side elevation of the segment and tool of FIG. 2 taken in the direction of the line 2A—2A.

Referring now to FIG. 1, a wafer 30 is there shown for providing a substrate upon which can be formed by conventional masking and deposition processes a large plurality of closely spaced magnetic heads. As is conventional, the body 32 of the wafer comprises the material from which the individual sliders 20 of the magnetic heads will be formed by slicing the individual heads from the wafer. At the appropriate spaced intervals throughout the face of the wafer the core elements 22 and the underlying and overlying electrically conductive coil elements 26, 28 (FIG. 9), to be described in greater detail hereinafter, are deposited along with suitable insulative layers. These individual magnetic heads are arranged in a plurality of aligned rows which are broken up into individual and essentially rectangular segments 34 (FIG. 1) which can be individually cut from the wafer for separate processing.

Figure 2:
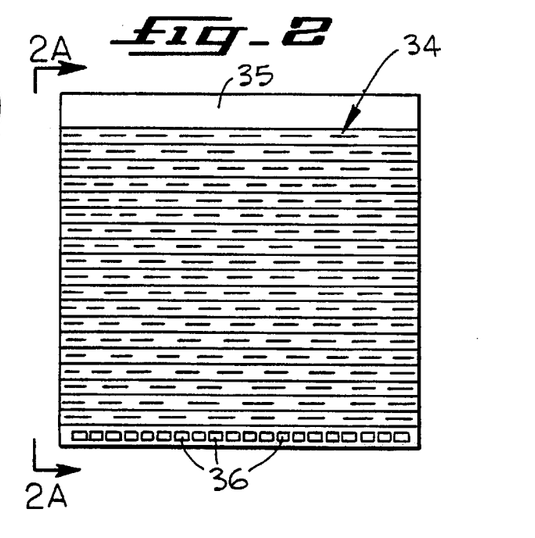
FIG. 2 is an enlarged front elevation of one of the wafer segments of FIG. 1 mounted for processing upon a sacrificial holding tool.

A single one of these wafer segments 34 is shown in FIG. 2 mounted upon a sacrificial holding tool 35. As can be seen in the side view of FIG. 2A the holding tool 35 is substantially thicker than the wafer segment so as to provide a stiff structure to permit the lapping and cutting of the wafer in the formation of the individual heads without deformation. The wafer segment 34 is adhesively attached to the holding tool 35 and will remain so attached during the lapping process to set the throat heights in each row of heads. When the heads are thereafter individually separated, however, the adhesive can be dissolved and the tool portion discarded. Each wafer segment (FIG. 2) is composed of a plurality of horizontal rows of magnetic heads 36 (prior to cutting) aligned both vertically and horizontally with only the lowermost one of such rows being illustrated diagrammatically in FIG. 2. This arrangement is shown in greater detail in FIG. 4 of the drawings wherein it can be seen that each individual magnetic head 18 deposited upon the surface of the wafer body 32 is comprised of the loop shaped magnetic core 22 having one leg thereof enclosed by a large coil 26 with electrical leads 27a, 27b extending therefrom and with the other leg of the core being enclosed by a small coil 28 having electrical leads 29a, 29b extending therefrom in a direction opposite from the leads 27a, 27b. As will be described in further detail hereinafter, each row in the array is first horizontally separated from the finished row therebelow along the lines 44 to eliminate the kerf area 40 and then, while still in the segment 34 on the face of tool 35, lapped to establish the appropriate throat heights in each of the aligned heads; then, after lapping, the finished row is severed along the line 44 from the remainder of segment 34 and cut along the lines 42 to remove the kerf area 45 leaving the individual magnetic heads 18.

The construction of the thin film heads of the present invention can be accomplished by conventional deposition, sputtering or plating processes using the conventional masking techniques. By making the slider 20, comprised of the wafer substrate material 32, of an electrically nonconductive material such as aluminum oxide, the conductive coils 26, 28 can be placed directly against the face of the base 32. If, on the other hand, an aluminum titanium carbide or some other conductive material is used for the wafer substrate, then an insulative layer would first have to be deposited on the substrate, as is well known. A series of spaced strips 50 (FIG. 6) of conductive material is next deposited against the face of the substrate 32 to form the inner layer of the coils 26 and 28, it being noted that coil 26, the conventional read/write coil of the magnetic head, covers one entire leg 22a of the core while the coil 28, which preferably includes only a single turn or a pair of turns, is located as close as possible to the gap 24 on the opposite leg 22b of the core. It will also be seen that the leads 27a, 27b, 29a, 29b extend from the opposite edges of the strips 50 outwardly of the core 22 at opposite sides thereof to provide separate electrical connections to each of the coils. An insulative layer 52 is then deposited upon the strips 50 in that area which the core 22 will overlie so as to electrically insulate the coils.

The magnetic core element 22, comprised of a magnetically soft core material such as permalloy or other thin film metal, is then deposited on the insulative layer 52 so that the inner sides 50 of the coils are exposed at the sides of each of the legs of the core element. A second insulative layer 54 (FIG. 6) is then deposited in two steps upon the face of the core element 22 with a first layer being laid down prior to the deposition of the outer sides of the coils 26, 28. These outer coil strips 56 (FIG. 6) are then deposited on the partially formed insulative layer 54 with the ends thereof being deepened so as to fold the strips 56 over onto the lower strips 50 to form the complete coils 26, 28 about the core 22 using conventional thin film processing techniques as are well understood by those skilled in the art. The final outer layer of insulative material 54 is then deposited to completely enclose and insulate the electrical coils 26, 28 except for the leads 27, 29.

Finally, a layer of a hard substance that can be deposited by standard plating or sputtering methods such as diamond-like carbon (DLC) 61 is deposited atop the core element 22 adjacent to the gap 24. The purpose of this layer is to provide a rigid support for the core 22 during the lapping process particularly in the very narrow throat area thereof so as to prevent deformations and crumbling in the relatively soft core material.

While the core element 22, as disclosed, is comprised of a single monolithic magnetically conductive material, it will be recognized that other composite core element constructions could be used, so long as at least one loop of magnetically conductive material is provided within the core dimensions.

Figure 11:
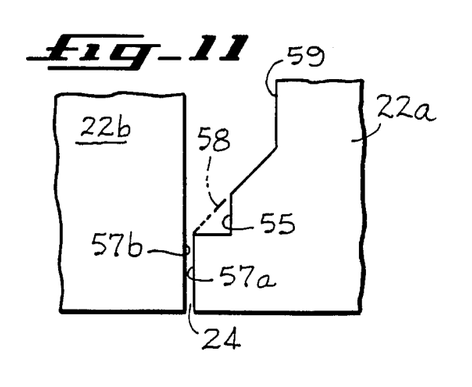
FIG. 11 is an enlarged view of the throat area of the magnetic head of FIG. 8.

A unique feature of the disclosed core 22 design is illustrated in FIG. 11 of the drawings. In the design of the legs or pole pieces of the core element at the gap two competing design considerations have to be recognized. First, in order to have a stable pole piece and sufficient signal strength at the gap it is desireable that the pole faces 57a, 57b (FIG. 11) in the throat area remain closely spaced and extend vertically for a substantial distance; however, this design presents a problem wherein varying write signal strengths create undesirable shifts in the position of the leading edge of the recorded bit in the underlying recording medium. By making one of the poles at the throat very short, the leading edge of each bit in the recording medium will be more correctly positioned under varying write signal strengths; however, such designs are mechanically unstable and generally lack sufficient signal strength at the gap. The traditional compromise has been to have one of the pole faces extend vertically for only a limited distance (as face 57a in FIG. 11) and then be joined by an inclined face (dashed line 58 in FIG. 11) to a widely spaced face 59 of the pole. In the present case, an improvement has been realized by creating a notch 55 at the upper edge of face 57a at the gap during the deposition process which serves to substantially increase the repeatability of the leading edge of the written bit under varying write signal strengths without unduly changing write field strength at the gap.

Figure 3:
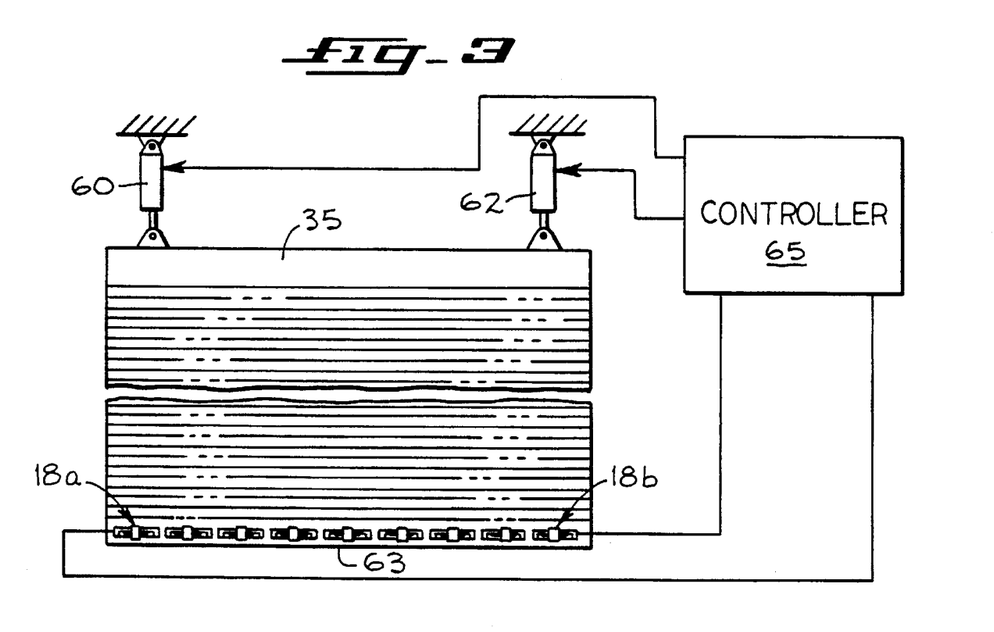
FIG. 3 is a diagrammatic front elevation, partially in block diagram, illustrating the lapping method that can be used in accordance with the process of the present invention to set the throat heights in a row of magnetic heads on the segment of FIG. 2.
Figure 4:
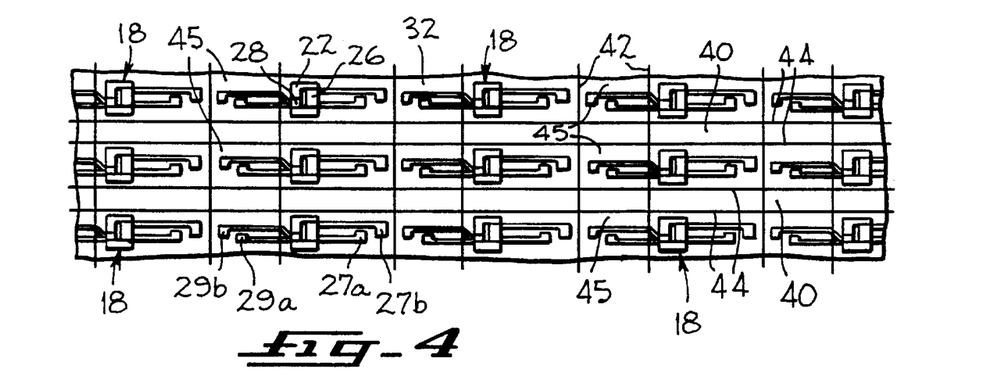
FIG. 4 is an enlarged elevation view of a portion of three rows of the magnetic head elements from the wafer segment of FIG. 2.
Figure 5:
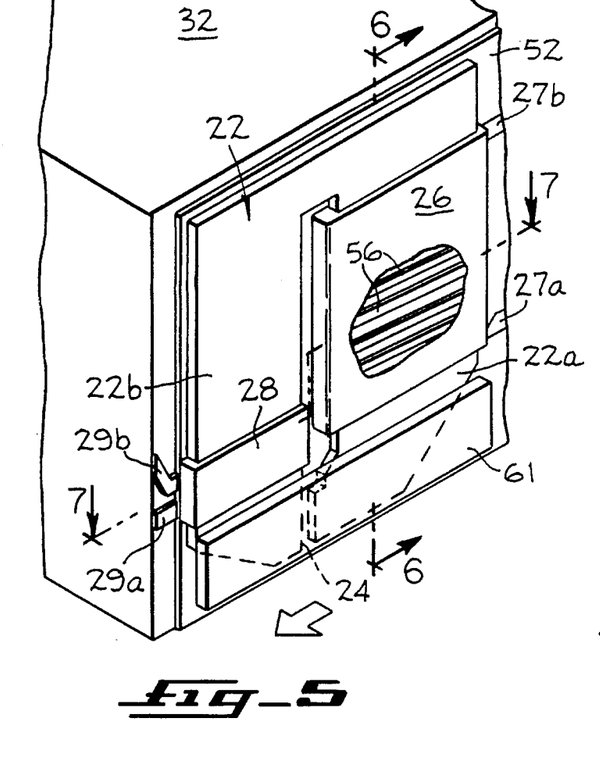
FIG. 5 is an enlarged isometric view of one of the magnetic head elements of FIG. 4 prior to the lapping thereof to set the throat height.
Figure 6:
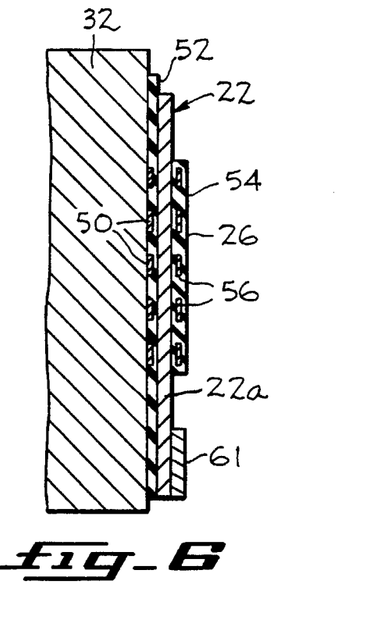
FIG. 6 is a section taken along line 6—6 of FIG. 5.
Figure 7:
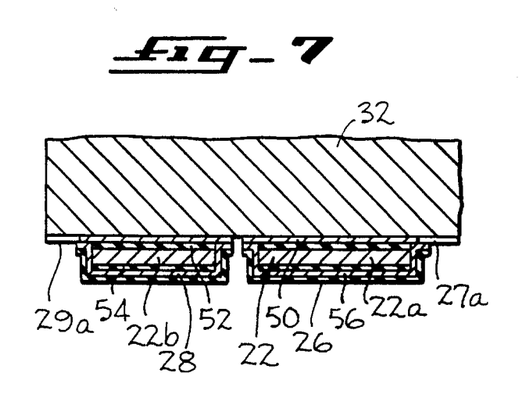
FIG. 7 is a section taken along line 7—7 of FIG. 5.

Once the individual magnetic head elements have been deposited on the face of the wafer 32, and the segments 34 have been severed therefrom, each segment is placed in a lapping machine controlled by a variable pressure guide apparatus as shown in FIG. 3 of the drawings. This device, which may be similar in construction and operate in a manner similar to that of the device disclosed in the aforementioned prior U.S. Pat. No. 4,675,986, applies pressure through two variable pressure actuators 60, 62 at opposite ends of the holding tool 35 thereby applying pressure on the undermost surface 63 of the horizontal array of magnetic head elements undergoing lapping of their gap areas. In a manner to be explained presently, signals are provided by the end head elements in the row of heads adjacent surface 63 to a controller 65 which compares the received signals and adjusts the pressure between the actuators 60, 62 to insure that not only the end head elements 18a, 18b in the array are being lapped to the same specifications but that each of the elements therebetween will also be correctly lapped, it being assumed that the deposition processes maintained a straight line in laying down each of the head elements. Obviously, to insure greater accuracy, other head elements 18, at appropriately spaced intervals in the line, could also be monitored.

It is an essential element of the present invention that the throat height, i.e. the vertical height of pole face 57a in FIG. 11, be set not at some predetermined physical dimension, as in the prior art, but at a dimension as determined by magnetic characteristics at the gap area which may vary according to magnetic variations in the core material at the gap, such variations being a natural result of variations common in the manufacturing processes. In a gapped recording structure the write field that is created at a given distance from the recording surface of the gap area is a function of the magnitude of flux in the core loop at the gap area and the percentage of said flux that "leaks" from the recording surface of the gap area when the underlying recording medium is present. The percentage of the loop flux that leaks from the gap is a function of the "magnetic" dimensions of the gap length, depth and height and the linearity (or lack thereof) of the core materials response to the varying flux densities created by the write current. When a fixed value and shape of write current is applied to the write coil of specific design, the flux in the loop will vary as a function of the magnetic dimensions of the gap area. Thus, the flux will vary as a function of throat height (gap depth) if the magnetic gap length and width dimensions are a constant. The magnitude of the magnetic flux and the rate of change of the magnetic flux are measured by placing the secondary coil 28 about the leg 22b of the core and observing the voltage output of the coil 28, such voltage output being indicative of and caused by the magnitude and rate of change of the flux in the core. By placing the coil 28 as close as possible to the gap area 24, the effect of the leakage flux that does not pass through the gap area will be minimized and the secondary coil voltage will give a more accurate indication of gap area magnetic dimensions.

Figure 12:
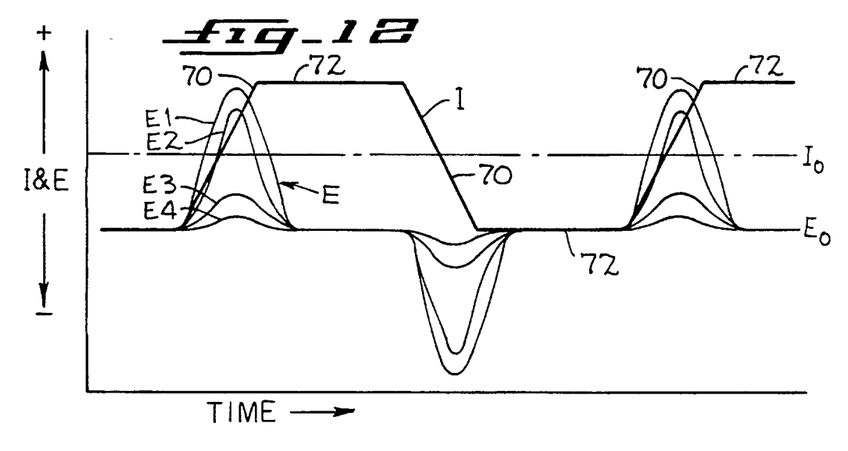
FIG. 12 is a graph showing the electrical input pulses and the electrical output response pulses utilizing the method of the present invention.

The pulses as applied to the primary coil 26 and as received by the secondary coil 28 under varying throat height conditions, i.e., under varying degrees of lapping of the gap surfaces of the head, are shown in FIG. 12. An alternating current I is provided to the primary winding 26 with such current being comprised of an alternating series of intervals 70 of change and intervals 72 of uniform current. The frequency and magnitude of this current should be the same as that of the write current or currents for which the head is being designed. The generated flux in the loop will create the output voltage E in the secondary winding 28 which, as shown in FIG. 12, is created by the input change intervals 70 and which will rise to a peak (when the core 22 saturates) and then drop to zero when the current is no longer changing. Since the voltage output E is directly dependent upon the reluctance in the loop provided by the core 22, and since this reluctance is the sum of the reluctance of the core 22 plus the reluctance of the gap, it will be recognized that the voltage E will be controlled primarily by the gap reluctance as the throat height is reduced during the lapping process since the gap reluctance will be significantly greater than the reluctance of the remainder of the loop. It is this gap reluctance which will determine the appropriate read/write characteristics of the head, and therefore it is toward a particular gap reluctance, i.e., flux condition at the gap, to which the process of the present invention will be directed rather than a specific throat height dimension. Since the gap reluctance is much greater than the core reluctance when the throat height nears its final desired dimension, minor changes in throat height will cause significant changes in the value of the output voltage E. As can be seen in FIGS. 12 and 8, the initial output voltage E1 produced prior to any lapping, i.e., with the underlying or gap surface 63 of the head as shown at 63(E1) (FIG. 8), will be a maximum value. After lapping the gap surface to 63(E2) the output voltage E2 is reduced as shown. As the gap surface 63(E3) nears its final dimension the output voltage E3 drops considerably. Finally, an output voltage E4 is obtained indicative of a gap reluctance or flux condition at the gap which has been preselected as providing the appropriate read/write characteristics. The thus produced final gap surface 63(E4) thereby defines the final throat height as determined by the final length of pole face 57a (FIG. 11).

In order to determine the voltage value E4 which can be used as a threshold value to terminate the lapping process, a test head of the particular magnetic head design being manufactured is provided which test head is determined to have the correct gap flux characteristics and to be dimensionally uniform throughout. This head then serves as the pattern for the production of all further heads. The voltage E1 (prior to lapping) and the voltage E4 (head lapped to correct throat height) are carefully measured during the manufacture of the test head, and the ratio of such voltages is established. Then, for each head thereafter produced using the aforedescribed process of the present invention, the initial voltage E1 will be measured to determine whether or not it is within acceptable tolerance limits of the voltage E1 of the test head, and if within the limits, the aforementioned ratio value is used to establish the value E4 which will terminate the lapping of the throat area. Thus, while the value of E4 may change from head to head as the initial measured value E1 varies slightly from head to head, the ratio of E1/E4 will remain constant. Also, the monitoring of the initial value E1 will determine the reliability of the initial deposition process and terminate further processing if the initial processing is too far out of line.

After the completion of the lapping operation to set the surface 63 of the head, the entire row of heads 18 will be severed from the remaining rows of heads in the segment 34, and the individual heads will then be cut from the severed strip as previously explained. Next, the end surfaces 66 and 67 (FIGS. 8 and 9) are cut at an angle to the flight surface 63, and the central portion of the slider element is provided with a recess 68 (FIGS. 9 and 10) to provide the appropriate aerodynamic characteristics of the conventional slider element 20 for use in a hard disk system or the like.

In the arrangement of FIG. 3, it will be recognized that the output voltages E are being read from, at least, each of the end heads 18a, 18b and provided to a controller 65 which adjusts the lapping pressure provided by actuators 60, 62 until the output voltages are equal, thus correcting for alignment inaccuracy in the initial wafer slicing operation defining the lowermost surface 63. Further processing of the output voltage E not only maintains the equality of the voltages on the heads to insure that all heads in the line are lapped to the same dimensions but looks for the specific value E4 to indicate the final throat height value. This may be done intermittently, but, preferably, appropriate connections can be made to the electrical leads 27, 29 to permit continuous electrical monitoring. Also, it will be recognized that other heads in the line can also be monitored in order to achieve greater accuracy in the lapping of each of the heads in the line.

Figures 13, 14:
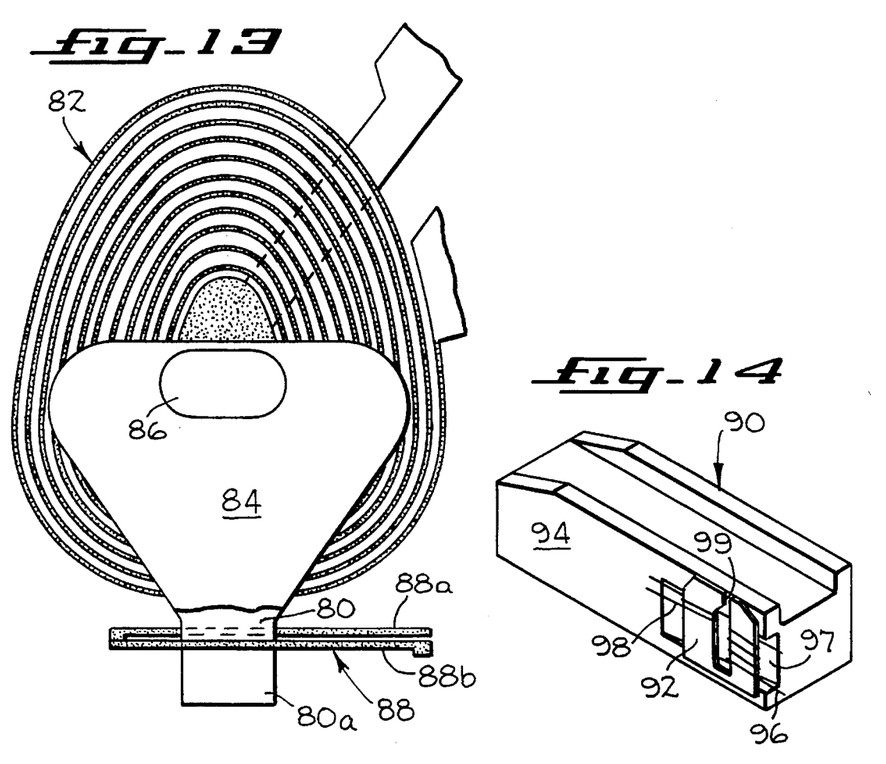
FIG. 13 is diagrammatic elevation of a second embodiment of the magnetic head of the present invention.
FIG. 14 is an isometric view of a third embodiment of the magnetic head of the present invention.

Although the preferred embodiment of the present invention utilizes the particular thin film head manufacturing process shown, it will be recognized that the present invention is not so limited and may generally be used with any head manufacturing process. For example, FIG. 13 illustrates a head manufactured by the more conventional thin film head manufacturing processes wherein the head is formed on the trailing face of the slider substrate. Thus, a bottom core leg 80 (lower end only being shown in FIG. 13) is deposited upon the substrate, the coil windings 82 are deposited thereon, and a top core leg 84 is deposited upon the composite bottom leg-winding structure, the two core legs 80,84 being joined by a connecting core piece 86. In such a conventional arrangement, the coil winding 82 will be used as the primary winding, analogous to winding 26 previously described, and a second winding 88 of one or two turns (analogous to coil 28 previously described) will be applied about one of the pole tips, i.e., the lower pole tip 80a in the embodiment shown in FIG. 13, directly adjacent to the gap. The winding 88 may be applied in two steps in a manner similar to that described in connection with the embodiment of FIGS. 1–12 by first depositing an underlayer 88a, then the bottom core leg 80, and finally the upper layer 88b of the winding 88 at the same time as the deposition of the winding 82. By applying the input current pulse train I to the leads of the winding 82 and monitoring the output voltage E in the winding 88 in the manner aforedescribed, the reduction of the lengths of the pole pieces 80a of the legs 80,84 to obtain the correct throat height at the gap may brought about.

FIG. 14 illustrates how the present invention could be adapted for a separately wound core, i.e., a non-film deposited head. Thus, in the head 90 there shown, a thin ferrite core 92 is suitably attached to the side of a slider member 94 and a pair of windings 96 and 98 are wound about the opposed legs thereof through a slot 97 in the side of the slider member. The winding 96 comprises the conventional read/write winding, while the winding 98, which is placed directly adjacent to the gap 99, comprises the secondary winding analogous to the secondary winding 28 in the first described embodiment.

It will be readily apparent that other types of magnetic heads, such as the "metal in gap" or the "double metal in gap" types, may also be manufactured by utilizing the process of the present invention since the differences in construction of the individual heads do not affect the underlying principles of the present invention.

Although the best modes contemplated for carrying out the present invention have been herein shown and described, it will be apparent that other modifications and variations may be made without departing from what is regarded to be the subject matter of the invention.

What is claimed is:

1. A method of correctly assessing the magnetic characteristics of an inductive magnetic head to be used to write upon closely adjacent magnetizable media, said magnetic head comprising core element of magnetically conductive material for providing a magnetic loop path having a gap therein and a pair of windings of electrically conductive material wound about the core element, said method comprising the steps of applying a varying electrical current to one of the pair of windings, and monitoring the flux generated within the core element via the other of said pair of windings in order to ascertain that the appropriate magnetic characteristics are present in the core element to create flux leakage at the gap of the appropriate shape and magnitude for the correct application of magnetic writing in the media, said one winding comprising the coil of the magnetic head to which the writing signals are to be subsequently applied and said other winding being placed directly adjacent to said gap in the core element.

2. A method according to claim 1 wherein said other winding has substantially fewer turns than said one winding.

3. A method according to claim 1 wherein during said monitoring step changes are made to the physical structure of the core element so as to alter the flux generated therein at the location of said other winding, and said monitoring step comprises monitoring an electrical output signal induced in said other winding until it is reduced to a preselected value.

4. A method of manufacturing an inductive magnetic head upon a substrate, such head being subsequently useful for writing on closely adjacent magnetizable media, comprising the steps of providing upon the substrate a core element of magnetically conductive material for providing a magnetic loop path having a gap therein and a pair of windings of electrically conductive material wound about the core element, gradually removing portions of the core element adjacent the gap therein to gradually reduce the throat height at the gap until the appropriate magnetic characteristics for the magnetic head are obtained so that the shape and magnitude of the magnetic field generated at the gap by the application of a write current to the head provides the appropriate magnetization in the media, and applying a varying current to one of the pair of windings and monitoring the flux generated in the core element via the other of said pair of windings during the step of removing in order to ascertain when said appropriate magnetic characteristics are obtained.

5. A method according to claim 4 wherein said one winding comprises the coil of the magnetic head used subsequently for writing upon said media and wherein said other winding is placed directly adjacent to said gap in the core element.

6. A method according to claim 5 wherein said other winding has substantially fewer turns than said one winding.

7. A method according to claim 4 wherein said monitoring step comprises monitoring an electrical output signal induced in said other winding until it is reduced to a preselected value.

8. A method according to claim 7 wherein said monitoring step includes monitoring said signal prior to the removal of any of the core element to obtain a first value and selecting said preselected value as a predetermined percentage of the first value.

9. A method of manufacturing thin film inductive magnetic heads upon a substrate, each of such heads being subsequently useful for writing on closely adjacent magnetizable media, comprising the steps of successively depositing at a series of spaced locations along a straight line layers of magnetically conductive material and closely spaced electrically conductive leads so as to define a series of core elements each providing a magnetic loop path with a gap therein and a pair of windings of said electrically conductive leads wound about each of the core elements at separate locations thereon, severing the substrate along said line so as to expose the ends of said core elements adjacent the gaps therein, successively removing material along the severed line to reduce the throat height at the gaps in the core elements until the appropriate magnetic characteristics for the series of magnetic heads are obtained so that the shape and magnitude of the magnetic field generated in each of the heads at the gap thereof by the application of a write current to the head provides the appropriate magnetization in the media, applying a current to one of the pair of windings of a first magnetic head at one position in the line of heads and monitoring the flux flow generated in the core element thereof via the other of the pair of windings in said first magnetic head in order to ascertain when said appropriate magnetic characteristics are obtained by the step of removing, and applying a current to one of the pair of windings of a second magnetic head spaced along the line of heads from said first magnetic head and monitoring the flux flow via the other of the windings in said second magnetic head in order to insure uniformity in the magnetic characteristics of each head along said line between said first and second magnetic heads.

10. A method according to claim 9 wherein said one winding comprises the coil of the magnetic head used subsequently for writing upon said media and wherein said other winding is placed directly adjacent to said gap in the core element.

11. A method according to claim 10 wherein said other winding has substantially fewer turns than said one winding.

12. A method according to claim 9 wherein said monitoring step comprises monitoring an electrical output signal induced in said other winding until it is reduced to a preselected value.

13. A method according to claim 12 wherein said monitoring step includes monitoring said signal prior to the removal of any of the core element during said removing step to obtain a first value and selecting said preselected value as a predetermined percentage of the first value.

* * * * *